United States Patent
Paschal et al.

(10) Patent No.: US 9,312,860 B1
(45) Date of Patent: Apr. 12, 2016

(54) GATED DIFFERENTIAL LOGIC CIRCUIT

(71) Applicant: International Business Machines Corporation, Armonk, NY (US)

(72) Inventors: Matthew J. Paschal, Rochester, MN (US); Raymond A. Richetta, Rochester, MN (US); Patrick L. Rosno, Rochester, MN (US); Timothy J. Schmerbeck, Mantorville, MN (US); Dereje G. Yilma, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/631,993

(22) Filed: Feb. 26, 2015

(51) Int. Cl.
*H03K 3/013* (2006.01)
*H03K 19/0185* (2006.01)
*G06F 17/50* (2006.01)

(52) U.S. Cl.
CPC .... *H03K 19/018578* (2013.01); *G06F 17/5027* (2013.01); *G06F 17/5031* (2013.01); *G06F 17/5081* (2013.01)

(58) Field of Classification Search
CPC .............................. H03K 3/013; H03K 5/2481
USPC ............ 326/121, 119, 112, 122, 83; 327/111, 327/112, 215
See application file for complete search history.

(56) References Cited

U.S. PATENT DOCUMENTS

| | | | |
|---|---|---|---|
| 5,491,441 A | 2/1996 | Goetschel et al. | |
| 6,600,352 B2 | 7/2003 | Miyamoto | |
| 6,680,637 B2 * | 1/2004 | Seo | H03K 5/1565 327/172 |
| 7,417,458 B2 | 8/2008 | Ahn et al. | |
| 7,459,940 B2 | 12/2008 | Franch | |
| 8,084,951 B2 | 12/2011 | Park et al. | |
| 8,143,946 B2 | 3/2012 | Aram | |
| 8,305,829 B2 | 11/2012 | Chan et al. | |
| 8,405,439 B2 * | 3/2013 | Wu | H03K 5/1565 327/175 |
| 8,723,625 B2 | 5/2014 | Lee | |
| 2001/0024130 A1 * | 9/2001 | Kameyama | H03K 19/018521 326/81 |
| 2008/0180152 A1 * | 7/2008 | Desortiaux | H03K 3/35625 327/203 |
| 2009/0091354 A1 * | 4/2009 | Aoki | H03K 5/1565 327/65 |
| 2014/0062740 A1 | 3/2014 | Sosio et al. | |
| 2014/0145607 A1 | 5/2014 | Goscha et al. | |

OTHER PUBLICATIONS

Novof, et al., "Fully Integrated CMOS Phase-Locked Loop with 15 to 240 MHz Locking Range and ±50 ps Jitter," IEEE Journal of Solid-State Circuits, Nov. 1995, pp. 1259-1266, vol. 30, No. 11, © 1995 IEEE DOI: 10.1109/4.475714.

* cited by examiner

*Primary Examiner* — Daniel D Chang
(74) *Attorney, Agent, or Firm* — Wood, Herron & Evans, LLP; Robert R. Williams

(57) ABSTRACT

A gated differential logic circuit can include a header device having a first terminal coupled to a supply voltage, and a second terminal; a second header device having a third terminal coupled to the supply voltage, and a fourth terminal; a footer device having a fifth terminal coupled to ground, and a sixth terminal; and a second footer device having a seventh terminal coupled to ground, and an eighth terminal. The circuit further includes a driver circuit having a first supply terminal coupled to the second terminal and a first ground terminal coupled to the sixth terminal, and a second driver circuit having a second supply terminal coupled to the fourth terminal and a second ground terminal coupled to the eighth terminal. A capacitor can couple the first supply terminal to the second ground terminal, while a second capacitor may couple the second supply terminal to the first ground terminal.

20 Claims, 6 Drawing Sheets

GATED DIFFERENTIAL LOGIC CIRCUIT

BACKGROUND

The present disclosure relates to integrated circuits (IC), and more specifically, to a gated differential logic circuit having a pair of miller connected capacitors configured to reduce power consumption and jitter.

Integrated circuits (ICs) used in digital electronic systems such as microprocessors, computer memory, and digital imaging sensors can be constructed from complementary metal oxide semiconductor (CMOS) devices. CMOS devices can include complementary and symmetrical networks of N-type and P-type metal oxide semiconductor field effect transistors (MOSFETs). In some CMOS devices, a network of N-type MOSFETs (NMOS) transistors can drive logic signals low (e.g., pull-down a logic signal to the negative end of a supply rail, such as ground), while a network of P-type MOSFETs (PMOS) may drive logic signals high (e.g., pull-up a logic signal to supply a voltage, such as VCC).

CMOS devices, such as clock buffers, can be driven by, and produce, differential signals where both true and complement signals are provided for a given logic function. These CMOS differential devices can include pairs of mirrored driver circuits, with each circuit operating on, and producing, one signal of a differential pair. In some systems, the driver circuits can be constructed on top of each other using stacked or cascaded CMOS devices.

Power consumption and jitter are influenced by the number of interconnected circuits in an IC. Switching power consumption includes a measure of the amount of energy dissipated by CMOS circuits as they transition from one binary state to another and can increase for the overall IC with the number of interconnected circuits. Jitter is a measure of a clock signal's deviation from its designed period. Jitter, like power consumption, can increase with the number of interconnected CMOS circuits in an IC.

SUMMARY

According to embodiments of the present disclosure, a gated differential logic circuit coupled to a supply voltage and to a ground can include a first header device having a first terminal and a second terminal, where the first terminal is coupled to the supply voltage. The circuit may further include a second header device having a third terminal and a fourth terminal, with the third terminal also being coupled to the supply voltage. Additionally, the gated differential logic circuit may include a first footer device having a fifth terminal and a sixth terminal, where the fifth terminal coupled to the ground. A second footer device may also be included, where the second footer device has a seventh terminal and an eighth terminal, the seventh terminal also being coupled to the ground. The gated differential logic circuit may also have a first driver circuit and a second driver circuit, with the first driver circuit having a first supply terminal coupled to the second terminal and a first ground terminal coupled to the sixth terminal, while the second driver circuit has a second supply terminal coupled to the fourth terminal and a second ground terminal coupled to the eighth terminal. A first capacitor can be coupled between the first supply terminal and the second ground terminal, while a second capacitor can be coupled between the second supply terminal and the first ground terminal.

According to various embodiments, a method of operating a gated differential logic circuit having a first and a second driver circuit, at least one header device, at least one footer device, and at least one feedback path, may include receiving a differential input signal at the first and second driver circuits, and generating, in response to receiving the differential input signal, a differential output signal from the first and second driver circuits. The method may also include providing a feedback voltage across the at least one feedback path between a power terminal of the first driver circuit and a ground terminal of the second driver circuit, where the power terminal is coupled to a power supply by the at least one header device, and the ground terminal is coupled to ground by the at least one footer device. The method may further include injecting, in response to the feedback voltage, a current associated with the at least one feedback path into the power terminal and the ground terminal to reduce jitter in the differential output signal.

Additional embodiments are directed towards design structures for a gated differential logic circuit coupled to a supply voltage and to a ground, and capable of filtering power supply noise and improving output drive without increasing power consumption.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
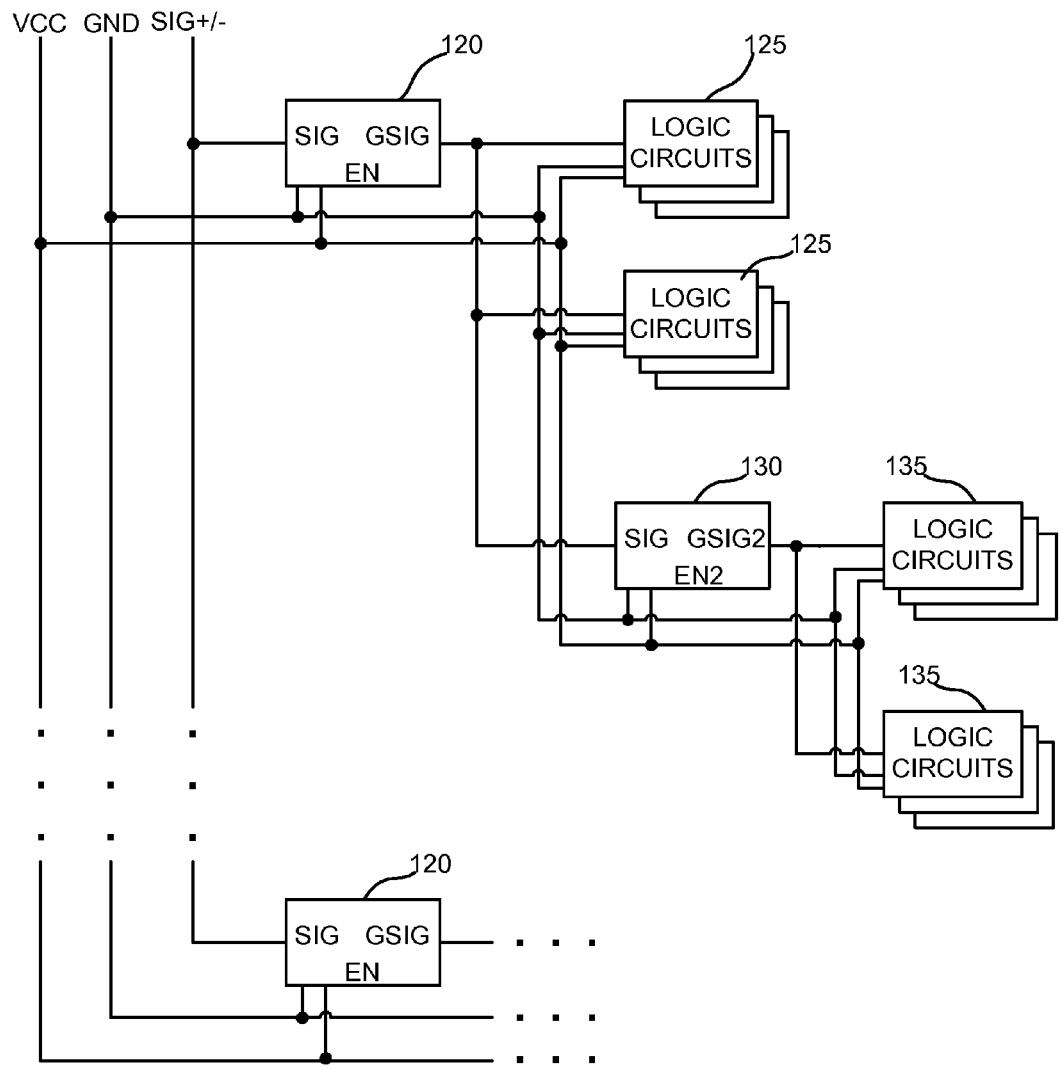
FIG. 1 depicts a block diagram of an electronic device having a network of circuits connected to a shared power supply and a set of differential signal pairs, according to various embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to integrated circuits (IC), and more specifically, to a gated differential logic circuit having a pair of miller connected capacitors configured to reduce power consumption and jitter. While the present disclosure is not necessarily limited to such applications, various aspects of the disclosure may be appreciated through a discussion of various examples using this context.

Power gating, including adding header and footer devices to circuits, can be used in IC devices to reduce power consumption and jitter by allowing gated circuits to be selectively disabled when the gated circuits' functionality are not being used in an IC device's operation. A gated circuit's header and footer devices can, however, add power losses and increase jitter in some cases. Various embodiments of the present disclosure are directed towards a gated differential logic circuit capable of filtering power supply noise and improving output drive without increasing power consumption. The gated differential logic circuit can include a set of capacitors configured to reduce jitter and power consumption. Each capacitor has a first terminal connected to an NMOS pull-down network of one driver circuit in a mirrored differential pair of driver circuits and a second terminal connected to a PMOS pull-up network of a second driver circuit in the mirrored differential pair. Driving a first driver circuit's output low enables the capacitor connected to the first driver circuit's pull-down network to help pull the second driver circuit's output high via the second driver circuit's connected pull-up network. Similarly, as the second driver circuit drives high, a voltage is fed back through the same capacitor to pull the output of the first driver circuit low. The gated differential logic circuit may reduce jitter by increasing the driver circuits' true and complement output drives (e.g., by reducing rise and fall times).

Various embodiments are directed towards a gated differential logic circuit having a pair of miller connected capacitors that can reduce jitter by isolating a pair of mirrored driver circuits from high frequency power supply noise. According to certain embodiments, the capacitors along with the header and footer devices can be configured to form resistor-capacitor (RC) filters that can reduce jitter in a gated differential logic circuit by filtering high frequency noise from the circuit's power supply. The capacitors can be relatively small compared to typical bypass capacitors due to the multiplicative property provided by the miller effect (described infra).

The term "couple" or "coupled" includes indirect and direct electrical connection. Thus, if a first device is coupled to a second device, that connection may be through a direct electrical connection, or through an indirect electrical connection via other devices and connections.

Turning now to the figures, FIG. 1 depicts a block diagram of an electronic device 100 having a network of circuits connected to a shared power supply and a set of differential signal pairs. The electronic device 100 has power supply VCC providing power to gated differential logic circuits 120 and 130, supply ground GND, and non-gated logic circuits 125 and 135. Although not shown in FIG. 1, according to some embodiments, one or more logic blocks can be connected to the power supply through intervening circuitry, including voltage/current regulators, charge pumps, and level shifters. The electronic device 100 in FIG. 1 also includes differential signal pair SIG+/−. The differential signal pair SIG+/− is an abstraction representing the set of differential signal pairs that can be available in an integrated circuit. Each differential signal pair in the set can include true and complement signals generated from at least one logic circuit (not shown).

Consistent with embodiments of the present disclosure, the gated differential logic blocks 120 can receive a first set of differential signal pairs SIG as input and generate a second set of differential signal pairs GSIG as output. The generated differential signal pairs GSIG can then be used by logic blocks 125 and 130. Similarly, gated logic block 130 can accept the differential signal pair GSIG and generate a third differential signal pair GSIG2 which may be used by logic blocks 135. Power consumption can be reduced during instances where the functionality provided by logic blocks 125, 130 and 135 are not required for the operation of electronic device 100 by providing control signals (not shown) to the inputs EN of gated differential logic block 120 to disable the operation of the gated differential logic block, preventing actuation of downstream logic blocks 125, 130, and 135. Finer grain power control can be effected by using a second control signal EN2 to disable the operation of gated differential logic block 130, thus preventing actuation of logic blocks 135. The control signals may be supplied by circuits (not shown) that are part of electronic device 100, or by other electronic devices (not shown).

Figure 2:
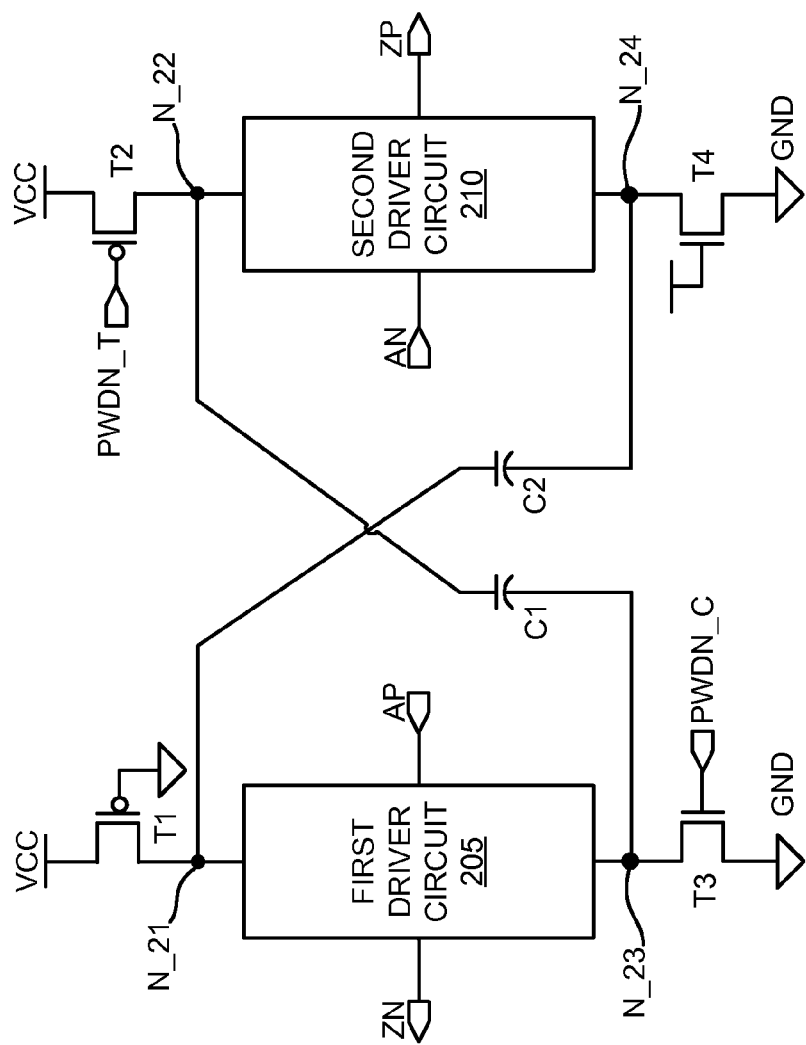
FIG. 2 depicts a schematic diagram of a gated differential logic circuit configured for reduced jitter and power consumption, according to various embodiments.

FIG. 2 depicts a schematic diagram of a gated differential logic circuit 200 configured for reduced jitter and power consumption. The gated differential logic circuit 200 includes a set of header devices T1 and T2, a set of footer devices T3 and T4, a pair of mirrored driver circuits 205 and 210, and a pair of miller connected capacitors (hereinafter capacitors) C1 and C2. A brief description of the function of each component of the gated differential logic circuit 200 follows. Detailed descriptions will be provided in the discussion of FIGS. 3-4.

Mirrored driver circuits 205 and 210 can perform the differential logic function of the gated differential logic circuit 200. According to some embodiments, both the first driver circuit 205 and the second driver circuit 210 may be CMOS logic circuits—other technologies, including bipolar junction transistor (BJT) and junction field effect (JFET) transistor logic, are possible. Although not shown, the first driver circuit 205 may have a PMOS pull-up network configured to drive outputs ZN high, and an NMOS pull-down network configured to drive the ZN low. The PMOS pull-up network can be coupled to node N_21 via a first power terminal, while the NMOS pull-down network can be coupled to node N_23 via a first ground terminal. Similarly, the second driver circuit 210 may have a PMOS pull-up network configured to drive outputs ZP high, and an NMOS pull-down network configured to drive the ZP low. The second driver circuit 210 can have its PMOS pull-up network coupled to node N_22 via a second power terminal, while the NMOS pull-down network can be coupled to node N_24 via a second ground terminal.

The header devices T1 and T2, and the footer devices T3 and T4, can form a power gating circuit around the mirrored driver circuits 205 and 210. Although the header devices T1 and T2, and the footer devices T3 and T4 in FIG. 2 are depicted as MOSFET devices, other switching devices, including BJTs and JFETs can be used. The header and footer devices can also be more complex logic functions using parallel as well as cascaded or stacked devices (e.g., transistors), as long as they are conveying control signals that are normally static during input signal switching (e.g., the header and footer devices can be multiplexers having control signals that do not change while the input to the driver circuits 305 and 310 are switching).

The capacitors C1 and C2 provide a bootstrapping function where by a signal level transition on the output of one of the mirrored driver circuits helps to drive a complementary transition on the other mirrored driver circuit. The capacitors C1 and C2 also form RC filters with the header devices T1 and T2, and footer devices T3 and T4, providing filtering from both supply voltage (e.g., VCC) and ground (e.g., GND) noise; keeping a relatively constant voltage across the C1 and C2 capacitors. Although capacitors C1 and C2 are represented in FIG. 2 as individual capacitors, capacitors C1 and C2 may each include the equivalent capacitances of networks of parallel and/or serially connected capacitors.

Figure 3:
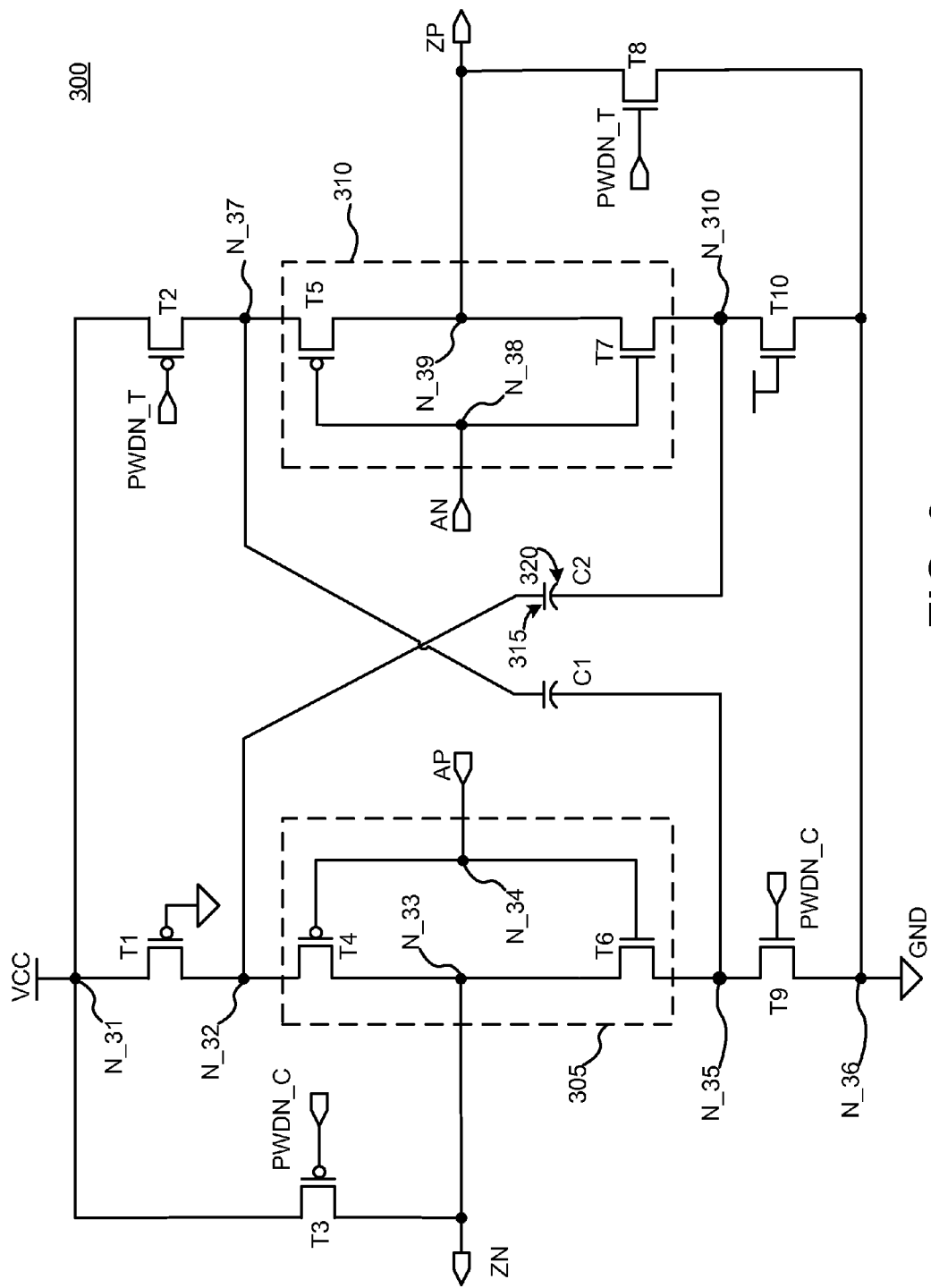
FIG. 3 depicts a schematic diagram of a gated CMOS differential logic circuit, according to various embodiments.

FIG. 3 depicts a schematic diagram of a gated CMOS differential logic circuit 300. The gated CMOS differential logic circuit 300 is an embodiment of the gated differential logic circuit 200 shown in FIG. 2, with the distinction that a pair of pull-up/pull-down transistors T3 and T8 are included gated CMOS differential logic circuit, and the first and second driver circuits from gated differential logic circuit 200 were replaced with a pair of CMOS driver circuits (hereinafter driver circuits) 305 and 310.

Examining FIG. 3 from left to right, the gated CMOS differential logic circuit 300 includes a first sub-circuit having PMOS transistors T1, T3, NMOS transistor T9, and a driver circuit 305 having PMOS transistor T4 and NMOS transistor T6. The gated differential CMOS circuit 300 also includes a second sub-circuit having PMOS transistor T2, NMOS transistors T8 and T10, and a driver circuit 310 having PMOS transistor T5 and NMOS transistor T7. The driver circuits 305 (e.g., a first driver circuit) and 310 (e.g., a second driver circuit) are both two-transistor CMOS inverters. The use of CMOS inverters are illustrative only, and other logic devices can be substituted (e.g., multiplexers, buffers, and various logic functions) as driver circuits. As stated herein, the header and footer devices can also be more complex logic functions using parallel as well as cascaded or stacked devices, as long as they are conveying control signals that are normally static during input signal switching.

In the first sub-circuit, transistor T1 (e.g., a first header device) has a gate terminal coupled to GND, a first drain/source terminal serially coupled to VCC, and a second drain/source terminal serially coupled to driver circuit 305 via a first drain/source terminal of transistor T4 (e.g., a first power terminal). Both a second drain/source terminal of transistor T4 and a first drain/source terminal of transistor T6 are coupled output port ZN at node N_33, while the gates of transistors T4 and T6 are coupled to input port AP at node N_34. Transistor T9 has drain/source terminals serially coupled between a second drain/source terminal of T6 (e.g., a first ground terminal) and GND, while transistor T3 has drain/source terminals serially coupled between VCC and output port ZN. The gates of transistors T3 and T9 are both coupled to input port PWDN_C.

Still examining FIG. 3, in the second sub-circuit, transistor T2 has a gate terminal coupled to the input signal PWDN_T, a first drain/source terminal serially coupled to VCC and a second drain/source terminal coupled to the driver circuit 310 via a serial connection to a first drain/source terminal of transistor T5 (e.g., a second power terminal). A second drain/source terminal of transistor T5 and a first drain/source terminal of transistor T7 are coupled to output port ZP at node N_39, while the gates of both T5 and T7 are coupled to input port AN at node N_38. Transistor T10 has a gate terminal coupled to VCC, and drain/source terminals serially coupled between a second drain/source terminal of T7 (e.g., a second ground terminal) and GND. Transistor T8 has drain/source terminals serially coupled between output port ZP at node N_39 and GND, and gate terminal coupled to input port PWDN_T.

A first capacitor C1 has a first terminal coupled to the first driver circuit at node N_35 and a second terminal coupled to the second driver circuit at node N_37, while a second capacitor C2 has a first terminal coupled to the first gated CMOS circuit at node N_32 and a second terminal coupled to the second gated CMOS circuit at node N_310.

The operation of the gated CMOS differential logic circuit 300 is now described in reference to FIG. 3. The input signals PWDN_T and PWDN_C can determine an operating mode of the gated CMOS differential logic circuit 300. Transistors T1, T3, and T9 form a gating circuit for the first driver circuit 305, while transistors T2, T8, and T10 form a gating circuit for the second driver circuit 310. The CMOS logic devices 305 and 310 can be CMOS logic devices having complementary inputs AP and AN, and producing complementary outputs ZN and ZP.

The input signals PWDN_T and PWDN_C determine whether the gated CMOS differential logic circuit 300 is operating in a normal mode or a power-down mode. In some embodiments, PWDN_T and PWDN_C can be complementary signals generated from a common source. In power-down mode the voltage at PWDN_T will be high and the voltage at PWDN_C will be low, while in normal mode PWDN_T will be low and PWDN_C will be high.

In the power-down mode, a high voltage on PWDN_T and a low voltage on PWDN_C turns off transistors T2 and T9, electrically disconnecting the first and second driver circuits from GND and VCC, respectively. Consequentially, the output ZN can be pulled high by transistor T3 and the first driver circuit's 305 PMOS pull-up network (e.g., transistor T4). Furthermore, the output ZP can be pulled low by transistor T8 and the second driver circuit's 310 NMOS pull-down network (e.g., transistor T7).

In the normal operating mode, transistors T1, T2, T9 and T10 are on, while T3 and T8 are off. Starting in initial state where input AP is high and input AN is low, means that output ZN will be driven low by the first driver circuit 305 and output ZP will be driven high by the second driver circuit 310. With respect to a conventional current flow from VCC at node N_31 to GND at node N_36, transistors T1 and T10 look like resistive loads, while T4 and T7 seem like open circuits (e.g., high impedance compared to T1 and T10). Consequently, there may be a voltage difference between node N_32 and node N_310 (e.g., the voltage at node N_32 can be close to VCC, while the voltage at node N_310 can be close to GND). The voltage difference between nodes N_32 and N_310 can charge capacitor C2 up to a voltage approximately equal to the voltage at node N_32.

Transitioning to a subsequent state where input AP is switched from high to low and AN is switched from low to high, the first driver circuit 305 will begin driving ZN high, while the second driver circuit 310 will start driving ZP low. If capacitor C1 and C2 were removed from the gated CMOS differential logic circuit 300, the presence of the gating circuit elements (e.g., the header and footer devices, and input signals PWDN_T and PWDN_C) could increase deviations in the rise times (e.g., the time is takes ZN to transition from driving low to driving high) and fall times (e.g., the time is takes ZP to transition from driving high to driving low) ZN and ZP. For example, header transistor T1 may reduce the rate at which conventional current flows from VCC through T4 to pull ZN high, increasing the rise time of ZN.

The increased deviations in output signals ZN and ZP's rise and fall times can increase jitter in systems using gated logic circuits by, for example, causing deviations in the arrival times of gated signals at the inputs of downstream circuits. Capacitors C1 and C2 can reduce jitter added by the header and footer devices by, for example, reducing the deviations in ZP and ZN's rise and fall times. When AP transitions from high to low, for example, a reduction in voltage at N_32 (caused by, e.g., the turning on of transistor T4 and the turning off of transistor T6) may cause capacitor C2 to discharge through T4 (e.g., positive charges on the top plate 315 of C2 will be dumped through T4). The added current from capacitor C2 discharging can increase the amount of current driving ZN high, thus reducing rise time. Furthermore, as capacitor C2 discharges through T4 negative charges will accumulate on the top plate 315 of capacitor C2. The rebalancing of positive and negative charges on the top plate 315 of capacitor C2 may pull current (e.g., positive charges) away from node N_310, reducing the voltage at node N_310 and increasing the rate at which ZP is driven low. As positive charges build up on the bottom plate 320 of capacitor C2, the positive charges on the bottom plate further repel positive charges on the top place 315, increasing the voltage at node N_32 and further help drive ZN high.

The pushing and pulling of current into and out of nodes N_32 and N_310 via capacitor C2 embodies a feedback mechanism where ZN driving high helps ZP drive low, and ZP driving low helps ZN drive high. The result can be that C2 provides a feedback path between the first and second driver circuits which reduces the rise and the fall times of ZN and ZP, which may ultimately result in less jitter than other known circuits. The feedback relationship holds for the scenario where ZN is transitioning to driving low and ZP is transitioning to driving high (e.g., where AP switches from low to high, and AN switches from high to low). In this scenario, capacitor C1 discharging through transistor T5 can help drive ZP high while pulling current out of node N_35. The flow of current out of node N_35 in to C1 can help drive ZN low, and further causing ZP to drive high.

In addition to reducing the rise and fall times of ZN and ZP, the capacitors C1 and C2 can reduce jitter caused by fluctuations in the power supply to gated logic circuits. Actuating logic circuits can cause the power supply rails (e.g., VCC and GND) to collapse due to spikes in power requirements. The collapse of the power rails may generate ripples that can increase jitter. The configuration of capacitors C1 and C2 can form RC filters configured to reject high frequency signals. The RC filters isolates the driver circuits from high frequency noise on VCC and GND, reducing the impact of a collapse of the power supply rails. For example, fluctuations in VCC due to a spike in power demand at node N_31 in the gated CMOS differential logic circuit 300 can generate high frequency noise at node N_32. If capacitor C2 was not present in the gated CMOS differential circuit 300 in a scenario where output ZN is driving high (e.g., input AP is low, while input AN is high), high frequency noise at node N_32 could propagate through T4 out to ZN. The configuration of capacitor C2 in the gated CMOS differential logic circuit 300 forms an RC filter with transistor T1, which rejects the high frequency noise at node N_32, providing a constant voltage across C2. Similarly, high frequency noise at node N_35 caused by collapse of the GND rail can be rejected by the RC filter formed with capacitor C1 and transistor T9.

The gated CMOS differential logic circuit 300 can perform the high frequency filtering described herein without the need for large capacitors by taking advantage of the Miller Effect. For example, capacitor C2 has a first terminal connected to node N_32 and a second terminal connected to node N_310. Because of the complementary arrangement of the left and right halves of gated CMOS differential logic circuit 300, the voltage at node N_32 tends to be higher than the voltage at node N_310, and signals appearing at node N_32 tend to transition in the opposite direction of signals appearing at node N_310. This shows that there is negative voltage difference between nodes N_32 and N_310. Since C2 is serially connected to two terminals exhibiting a negative voltage differential the effective capacitance of C2 (e.g., the total capacitance between the first power terminal and the second ground terminal attributable to C2) can be determined by C2's physical capacitance multiplied by a factor of two determined by, inter alia, the voltage differential between nodes N_32 and N_310. Similarly, the effective capacitance of C1 (e.g., the total capacitance between the second power terminal and the first ground terminal attributable to C1) can be determined by C1's physical capacitance multiplied by a factor determined by, inter alia, the differential gain between nodes N_35 and N_37. Multiplication effect of the Miller Theorem means that small values of C1 and C2 may be able to perform the filtering function described previously.

Figure 4:
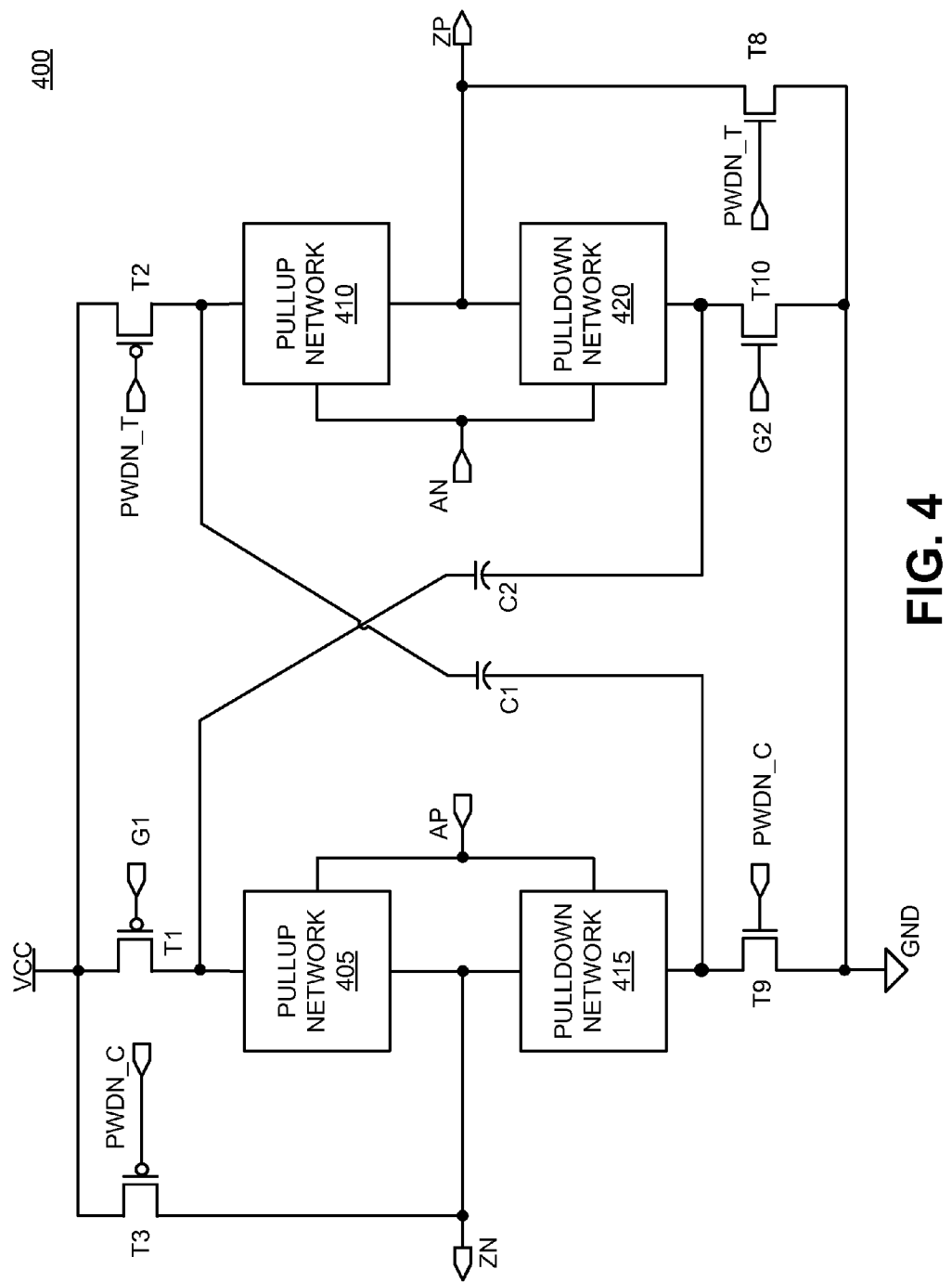
FIG. 4 depicts a schematic diagram of an abstracted gated CMOS differential logic circuit, according to various embodiments.

FIG. 4 depicts a schematic diagram of an abstracted gated CMOS differential logic circuit 400. The abstracted gated CMOS differential logic circuit 400 is similar to the gated CMOS differential circuit 300 shown in FIG. 3, with two notable exceptions. First, the first and second driver circuits in FIG. 3 are replaced by blocks representing PMOS pull-up networks (e.g., references 405 and 410) and blocks representing NMOS pull-down networks (e.g., references 415 and 420). The pull-up network in FIG. 3 includes PMOS transistors T4 and T5, while the pull-down network includes NMOS transistors T6 and T7. Blocks 405, 410, 415 and 420 illustrate that the inverters used in FIG. 3 can be replaced by arbitrary CMOS logic circuits having differential inputs and components arranged in a pull-up/pull-down network configuration.

The second distinction between the circuit in FIG. 3 and the circuit in FIG. 4 is that the gates of gating transistors T1 and T10 in FIG. 4 are tied to input signals G1 and G2, respectively, rather than being tied to the power rails. In some embodiments, the input signals G1 and G2 may be supplied by other logic circuits (not shown). In other embodiments, G1 may be connected to GND, while G2 may be connected to VCC.

Figure 5:
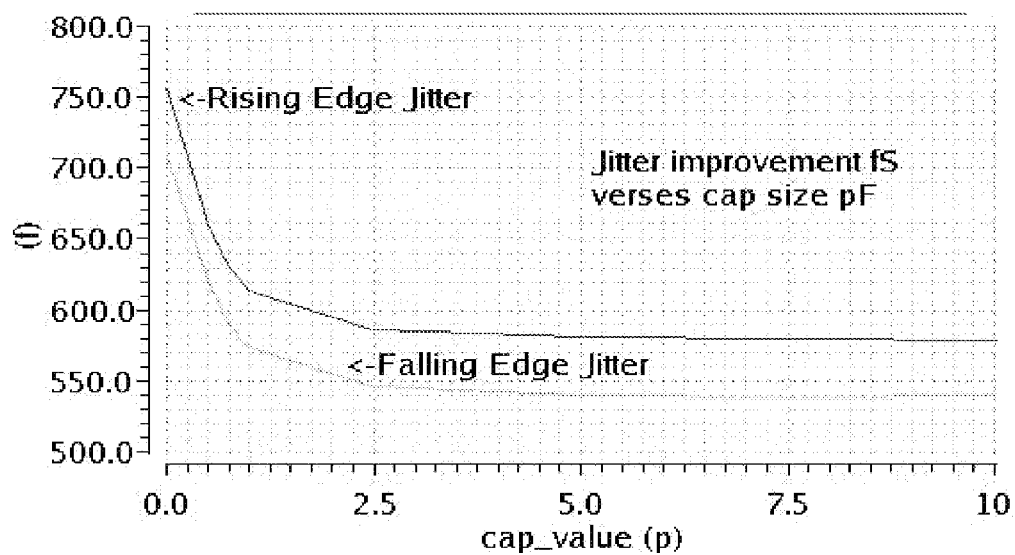
FIG. 5 depicts a plot of rising and falling edge jitter as a function of capacitor values generated from a simulation of an exemplary embodiment of a gated CMOS differential logic circuit, according to various embodiments.

FIG. 5 depicts a plot of rising and falling edge jitter as a function of capacitor values generated from a simulation of an exemplary embodiment of a gated CMOS differential logic circuit, according to various embodiments. The vertical axis in FIG. 5 represents jitter measured in femtoseconds (fs), while the horizontal axis represents the capacitance of the capacitors (e.g., capacitors C1 and C2 in gated CMOS differential logic circuit 300) in picofarads. FIG. 5 shows that both rising and falling edge jitter is above 700 fs when the capacitance of C1 and C2 are zero (e.g., the capacitors are not present in the gated CMOS differential logic circuit 300), and drops off as capacitance values are increased.

Figure 6:
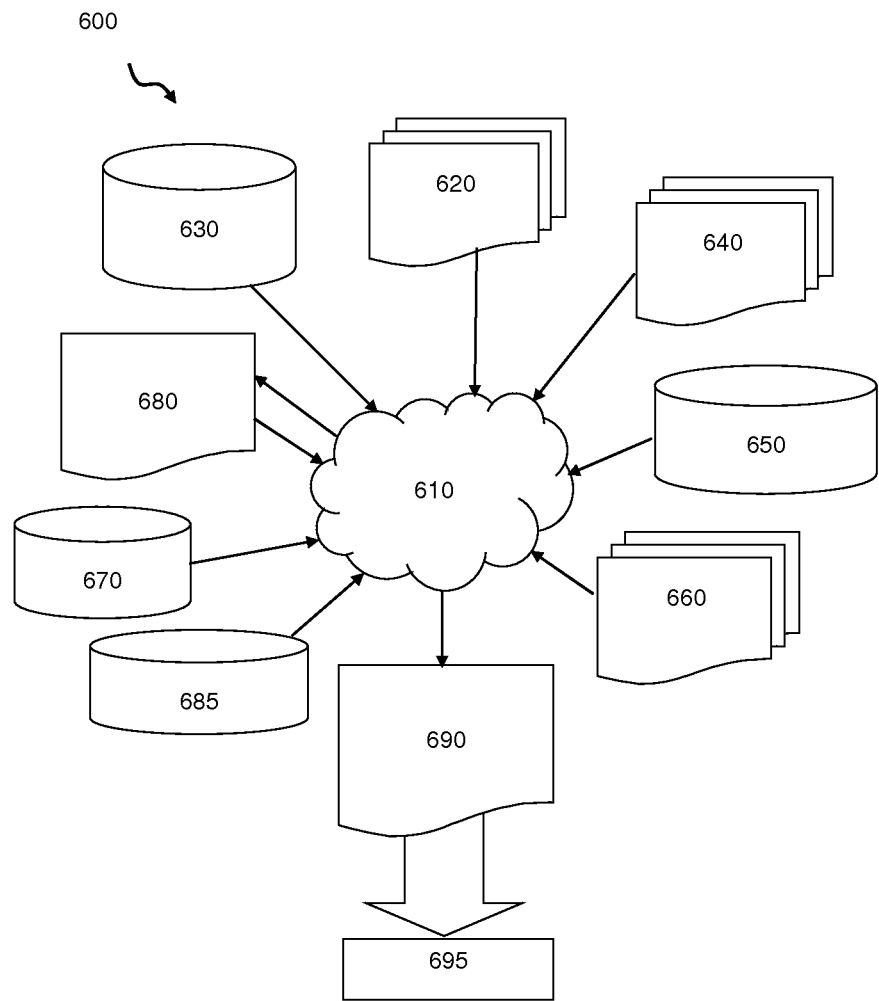
FIG. 6 is a flow diagram of a design process used in semiconductor design, manufacture, and/or test.

FIG. 6 shows a block diagram of an exemplary design flow 600 used for example, in semiconductor IC logic design, simulation, test, layout, and manufacture. Design flow 600 includes processes, machines and/or mechanisms for processing design structures or devices to generate logically or otherwise functionally equivalent representations of the design structures and/or devices described above and shown in FIGS. 1-5. The design structures processed and/or generated by design flow 600 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 600 may vary depending on the type of representation being designed. For example, a design flow 600 for building an application specific IC (ASIC) may differ from a design flow 600 for designing a standard component or from a design flow 600 for instantiating the design into a programmable array, for example a programmable gate array (PGA) or a field programmable gate array (FPGA) offered by Altera® Inc. or Xilinx® Inc.

FIG. 6 illustrates multiple such design structures including an input design structure 620 that is preferably processed by a design process 610. Design structure 620 may be a logical simulation design structure generated and processed by design process 610 to produce a logically equivalent functional representation of a hardware device. Design structure 620 may also or alternatively comprise data and/or program instructions that when processed by design process 610, generate a functional representation of the physical structure of a hardware device. Whether representing functional and/or structural design features, design structure 620 may be generated using electronic computer-aided design (ECAD) such as implemented by a core developer/designer. When encoded on a machine-readable data transmission, gate array, or storage medium, design structure 620 may be accessed and processed by one or more hardware and/or software modules within design process 610 to simulate or otherwise functionally represent an electronic component, circuit, electronic or logic module, apparatus, device, or system such as those shown in FIGS. 1-5. As such, design structure 620 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 610 preferably employs and incorporates hardware and/or software modules for synthesizing, translating, or otherwise processing a design/simulation functional equivalent of the components, circuits, devices, or logic structures shown in FIGS. 1-5 to generate a netlist 680 which may contain design structures such as design structure 620. Netlist 680 may comprise, for example, compiled or otherwise processed data structures representing a list of wires, discrete components, logic gates, control circuits, I/O devices, models, etc. that describes the connections to other elements and circuits in an integrated circuit design. Netlist 680 may be synthesized using an iterative process in which netlist 680 is resynthesized one or more times depending on design specifications and parameters for the device. As with other design structure types described herein, netlist 680 may be recorded on a machine-readable data storage medium or programmed into a programmable gate array. The medium may be a nonvolatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 610 may include hardware and software modules for processing a variety of input data structure types including netlist 680. Such data structure types may reside, for example, within library elements 630 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 640, characterization data 650, verification data 660, design rules 670, and test data files 685 which may include input test patterns, output test results, and other testing information. Design process 610 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 610 without deviating from the scope and spirit of the invention. Design process 610 may also include modules for performing standard circuit design processes such as timing analysis, verification, design rule checking, place and route operations, etc.

Design process 610 employs and incorporates logic and physical design tools such as HDL compilers and simulation model build tools to process design structure 620 together with some or all of the depicted supporting data structures along with any additional mechanical design or data (if applicable), to generate a second design structure 690. Design structure 690 resides on a storage medium or programmable gate array in a data format used for the exchange of data of mechanical devices and structures (e.g. information stored in an IGES, DXF, Parasolid XT, JT, DRG, or any other suitable format for storing or rendering such mechanical design structures). Similar to design structure 620, design structure 690 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIGS. 1-5. In one embodiment, design structure 690 may comprise a compiled, executable HDL simulation model that functionally simulates the devices shown in FIGS. 1-5.

Design structure 690 may also employ a data format used for the exchange of layout data of integrated circuits and/or symbolic data format (e.g. information stored in a GDSII (GDS2), GL1, OASIS, map files, or any other suitable format for storing such design data structures). Design structure 690 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIGS. 1-5. Design structure 690 may then proceed to a stage 695 where, for example, design structure 690: proceeds to tape-out, is released to manufacturing, is released to a mask house, is sent to another design house, is sent back to the customer, etc.

What is claimed is:

1. A gated differential logic circuit coupled to a supply voltage and to a ground, the gated differential logic circuit comprising:
   a first header device having a first terminal and a second terminal, the first terminal coupled to the supply voltage;
   a second header device having a third terminal and a fourth terminal, the third terminal coupled to the supply voltage;
   a first footer device having a fifth terminal and a sixth terminal, the fifth terminal coupled to the ground;

a second footer device having a seventh terminal and an eighth terminal, the seventh terminal coupled to the ground;

a first driver circuit having a first supply terminal coupled to the second terminal and a first ground terminal coupled to the sixth terminal;

a second driver circuit having a second supply terminal coupled to the fourth terminal and a second ground terminal coupled to the eighth terminal;

a first capacitor coupled between the first supply terminal and the second ground terminal; and a second capacitor coupled between the second supply terminal and the first ground terminal.

2. The gated differential logic circuit of claim 1, wherein:

the first driver circuit is a complementary metal oxide semiconductor (CMOS) circuit having a first P-type metal-oxide-semiconductor (PMOS) pull-up network configured to couple the first supply terminal to a first output node and a first N-type metal-oxide-semiconductor (NMOS) pull-down network configured to couple the first output node to the first ground terminal, and the second driver circuit is a CMOS circuit having a second PMOS pull-up network configured to couple the second supply terminal to a second output node and a second NMOS pull-down network configured to couple the second output node to the ground terminal.

3. The gated differential logic circuit of claim 1, wherein:

the first header device is a PMOS transistor having a gate terminal connected to the ground, and the second header device is a PMOS transistor having a gate terminal connected to a first input signal.

4. The gated differential logic circuit of claim 1, wherein:

the first footer device is an NMOS transistor having a first gate terminal connected to a second input signal, and the second footer device is an NMOS transistor having a second gate terminal connected to the supply voltage.

5. The gated differential logic circuit of claim 1, wherein the first and second driver circuits are CMOS inverters.

6. The gated differential logic circuit of claim 1, wherein the gated differential logic circuit is constructed using stacked CMOS devices.

7. A method of operating a gated differential logic circuit having a first and a second driver circuit, at least one header device, at least one footer device, and at least one feedback path, the method comprising:

receiving a differential input signal at the first and second driver circuits;

generating, in response to receiving the differential input signal, a differential output signal from the first and second driver circuits;

providing a feedback voltage across the at least one feedback path between a power terminal of the first driver circuit and a ground terminal of the second driver circuit, wherein the power terminal is coupled to a power supply by the at least one header device, wherein the ground terminal is coupled to ground by the at least one footer device; and injecting, in response to the feedback voltage, a current associated with the at least one feedback path into the power terminal and the ground terminal to reduce jitter in the differential output signal.

8. The method of claim 7, wherein the at least one feedback path includes at least one capacitor configured to couple the power terminal to the ground terminal.

9. The method of claim 8, wherein the effective capacitance of the at least one capacitor corresponds with a differential gain between the power terminal and the ground terminal.

10. The method of claim 8, further comprising forming a resistor-capacitor (RC) filter with the at least one capacitor and the at least one header device, wherein the RC filter rejects high frequency noise from the power supply.

11. The method of claim 8, further comprising forming an RC filter with the at least one capacitor and the at least one footer device, wherein the RC filter rejects high frequency noise from the ground.

12. A design structure tangibly embodied in a machine readable medium for designing, manufacturing, or testing an integrated circuit, the design structure specifying a gated differential logic circuit coupled to a supply voltage and to a ground, the design structure comprising:

a first header device having a first terminal and a second terminal, the first terminal coupled to the supply voltage;

a second header device having a third terminal and a fourth terminal, the third terminal coupled to the supply voltage;

a first footer device having a fifth terminal and a sixth terminal, the fifth terminal coupled to the ground;

a second footer device having a seventh terminal and an eighth terminal, the seventh terminal coupled to the ground;

a first driver circuit having a first supply terminal coupled to the second terminal and a first ground terminal coupled to the sixth terminal;

a second driver circuit having a second supply terminal coupled to the fourth terminal and a second ground terminal coupled to the eighth terminal;

a first capacitor coupled between the first supply terminal and the second ground terminal; and a second capacitor coupled between the second supply terminal and the first ground terminal.

13. The design structure of claim 12, wherein the design structure comprises a netlist.

14. The design structure of claim 12, wherein the design structure resides on storage medium as a data format used for the exchange of layout data of integrated circuits.

15. The design structure of claim 12, wherein the design structure resides in a programmable gate array.

16. The design structure of claim 12, wherein:

the first driver circuit is a complementary metal oxide semiconductor (CMOS) circuit having a first P-type metal-oxide-semiconductor (PMOS) pull-up network configured to couple the first supply terminal to a first output node and a first N-type metal-oxide-semiconductor (NMOS) pull-down network configured to couple the first output node to the first ground terminal, and the second driver circuit is a CMOS circuit having a second PMOS pull-up network configured to couple the second supply terminal to a second output node and a second NMOS pull-down network configured to couple the second output node to the ground terminal.

17. The design structure of claim 12, wherein:

the first header device is a PMOS transistor having a gate terminal connected to the ground, and the second header device is a PMOS transistor having a gate terminal connected to a first input signal.

18. The design structure of claim 12, wherein:

the first footer device is an NMOS transistor having a first gate terminal connected to a second input signal, and the second footer device is an NMOS transistor having a second gate terminal connected to the supply voltage.

19. The design structure of claim 12, wherein the first and second driver circuits are CMOS inverters.

20. The design structure of claim 12, wherein the gated differential logic circuit is constructed using stacked CMOS devices.

\* \* \* \* \*